United States Patent
Chen et al.

(10) Patent No.: US 10,469,876 B2
(45) Date of Patent: Nov. 5, 2019

(54) NON-LOCAL ADAPTIVE LOOP FILTER COMBINING MULTIPLE DENOISING TECHNOLOGIES AND GROUPING IMAGE PATCHES IN PARALLEL

(71) Applicant: MEDIATEK INC., Hsinchu (TW)

(72) Inventors: Ching-Yeh Chen, Taipei (TW);
Tzu-Der Chuang, Zhubei (TW);
Chih-Wei Hsu, Hsinchu (TW);
Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/844,190

(22) Filed: Dec. 15, 2017

(65) Prior Publication Data

US 2018/0184128 A1 Jun. 28, 2018

Related U.S. Application Data

(60) Provisional application No. 62/437,766, filed on Dec. 22, 2016.

(51) Int. Cl.
| | | |
|---|---|---|
| H04N 19/107 | (2014.01) | |
| H04N 19/117 | (2014.01) | |
| H04N 19/134 | (2014.01) | |
| H04N 19/176 | (2014.01) | |
| H04N 19/189 | (2014.01) | |
| H04N 19/46 | (2014.01) | |
| H04N 19/82 | (2014.01) | |
| H04N 19/86 | (2014.01) | |
| H04N 19/96 | (2014.01) | |

(52) U.S. Cl.
CPC .......... *H04N 19/86* (2014.11); *H04N 19/107* (2014.11); *H04N 19/117* (2014.11); *H04N 19/176* (2014.11); *H04N 19/82* (2014.11); *H04N 19/96* (2014.11)

(58) Field of Classification Search
CPC ..... H04N 19/134; H04N 19/189; H04N 19/46
USPC ........................................ 375/240.02, 240.08
See application file for complete search history.

(56) References Cited

U.S. PATENT DOCUMENTS

| | | | | |
|---|---|---|---|---|
| 2012/0121188 A1* | 5/2012 | Kenji | ..................... | H04N 19/46 382/196 |
| 2013/0208788 A1* | 8/2013 | Chen | ..................... | H04N 19/82 375/240.02 |
| 2014/0093180 A1* | 4/2014 | Esenlik | .................. | H04N 19/70 382/233 |
| 2017/0316602 A1* | 11/2017 | Smirnov | ............... | G06T 3/0068 |

* cited by examiner

*Primary Examiner* — Dominic D Saltarelli
(74) *Attorney, Agent, or Firm* — Oblon, McClelland, Maier & Neustadt, L.L.P.

(57) ABSTRACT

Aspects of the disclosure provide a method for denoising a reconstructed picture in a video coding system. The method can include providing two or more candidate non-local denoising technologies, selecting a target non-local denoising technology from the two or more candidate non-local denoising technologies for a patch group, and denoising the patch group of the reconstructed picture with the target non-local denoising technology. Besides, two parallel processing methods are provided for forming patch groups with predictor-based searching algorithms.

20 Claims, 5 Drawing Sheets

NON-LOCAL ADAPTIVE LOOP FILTER COMBINING MULTIPLE DENOISING TECHNOLOGIES AND GROUPING IMAGE PATCHES IN PARALLEL

INCORPORATION BY REFERENCE

This present disclosure claims the benefit of U.S. Provisional Application No. 62/437,766, "Methods of Improved Non-local Adaptive Loop Filters" filed on Dec. 22, 2016, which is incorporated herein by reference in its entirety.

TECHNICAL FIELD

The present disclosure relates to video coding techniques. Specifically, the present disclosure describes non-local image denoising technologies implemented in a non-local adaptive loop filter in a video codec.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Block-based motion compensation, transform, and quantization are broadly employed for video compression to improve performance of video communication systems. However, due to coarse quantization and motion compensation, compression noise can be introduced which causes artifacts, such as blocking, ringing, and blurring in reconstructed pictures. In-loop filters can be employed to reduce the compression noise, which can not only improve quality of decoded pictures, but also provide high quality reference pictures for succeeding pictures to save coding bits. A non-local adaptive loop filter is one type of such in-loop filter.

SUMMARY

Aspects of the disclosure provide a method for denoising a reconstructed picture in a video coding system. The method can include providing two or more candidate non-local denoising technologies, selecting a target non-local denoising technology from the two or more candidate non-local denoising technologies for a patch group, and denoising the patch group of the reconstructed picture with the target non-local denoising technology.

In an embodiment, the method can further include receiving the reconstructed picture, dividing the reconstructed picture into current patches, and forming patch groups each including a current patch and a number of reference patches that are similar to the current patch. In one example, the two or more candidate non-local denoising technologies includes at least one of a non-local low-rank denoising technology, a non-local means denoising technology, a block matching and three-dimensional filtering denoising technology, or a three-dimensional discrete cosine transform denoising technology.

Embodiments of the method can include selecting, based on a characteristic of to-be-processed video data, the target non-local denoising technology from the two or more candidate non-local denoising technologies. Embodiments of the method can include selecting the target non-local denoising technology for denoising the patch group based on a characteristic of a current patch and/or reference patches of the patch group. In an embodiment, selecting the target non-local denoising technology for denoising the patch group is based on one or a combination of a distortion between a current patch and a reference patch in the patch group, texture of the current patch, texture of the patch group, or which color component the patch group being of.

In one example, when a largest distortion between a current patch and reference patches in the patch group is smaller than a threshold, a non-local means denoising technology is selected as the target non-local denoising technology, and when the largest distortion between the current patch and the reference patches in the patch group is greater than the threshold, a non-local low-rank denoising technology is selected as the target non-local denoising technology.

In one example, a non-local means denoising technology is selected as the target non-local denoising technology when the reconstructed picture is of chroma component, and a non-local low-rank denoising technology is selected as the target non-local denoising technology when the reconstructed picture is of luma component.

In one example, when a variance of a current patch or patches in the patch group is smaller than a threshold, a non-local means denoising technology is selected as the target non-local denoising technology, and when the variance of the current patch or the patches in the patch group is greater than a threshold, a non-local low-rank denoising technology is selected as the target non-local denoising technology.

Embodiments of the method can include selecting the target non-local denoising technology for processing a picture or a picture region according to a characteristic of the picture or the picture region. In one example, a syntax element indicating the target non-local denoising technology is signaled from a video encoder to a video decoder. In one example, the syntax element is incorporated at patch level, block level, coding tree block (CTB) level, coding tree unit (CTU) level, slice level, or sequence level of a bitstream.

In one example, the two or more candidate non-local denoising technologies are configured into at least two candidate groups, and selecting the target non-local denoising technology from the two or more candidate non-local denoising technologies for the patch group can include determining a selected group from the at least two candidate groups, and selecting, based on a characteristic of to-be-processed video data, one candidate non-local denoising technology from the selected group as the target non-local denoising technology. In one example, a syntax element that indicates the selected group is signaled from a video encoder to a video decoder.

Aspects of the disclosure provide an apparatus for denoising a reconstructed picture in a video coding system. The apparatus can include circuitry configured to provide two or more candidate non-local denoising technologies, select a target non-local denoising technology from the two or more candidate non-local denoising technologies for a patch group, and denoise the patch group of the reconstructed picture with the target non-local denoising technology.

Aspects of the disclosure provide a non-transitory computer-readable medium storing instructions that, when executed by a video coding system, cause the video coding system to provide two or more candidate non-local denoising technologies, select a target non-local denoising technology from the two or more candidate non-local denoising technologies for a patch group, and denoise the patch group of the reconstructed picture with the target non-local denoising technology.

Aspects of the disclosure provide a first parallel processing method for forming patch groups. The first method can include receiving a reconstructed picture, partitioning the reconstructed picture into current patches, partitioning the reconstructed picture into parallel processing regions that each include a subset of the current patches, processing the parallel processing regions to form patch groups for the current patches by searching for a set of reference patches similar to a respective current patch with a predictor-based search algorithm, wherein at least two of the parallel processing regions are processed in parallel, and each of the at least two of the control regions is processed without usage of patch predictors of current patches outside the respective control region.

Aspects of the disclosure provide a second parallel processing method for forming patch groups. The second method can include receiving a reconstructed picture, partitioning the reconstructed picture into current patches, partitioning the reconstructed picture into parallel-processing regions that each include a subset of the current patches, and processing the parallel-processing regions to form patch groups for the current patches by searching for a set of reference patches similar to a respective current patch with a predictor-based search algorithm, wherein current patches within a first parallel-processing region are processed in parallel to form patch groups using the predictor-based search algorithm without usage of patch predictors of the current patches within the first parallel processing region.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
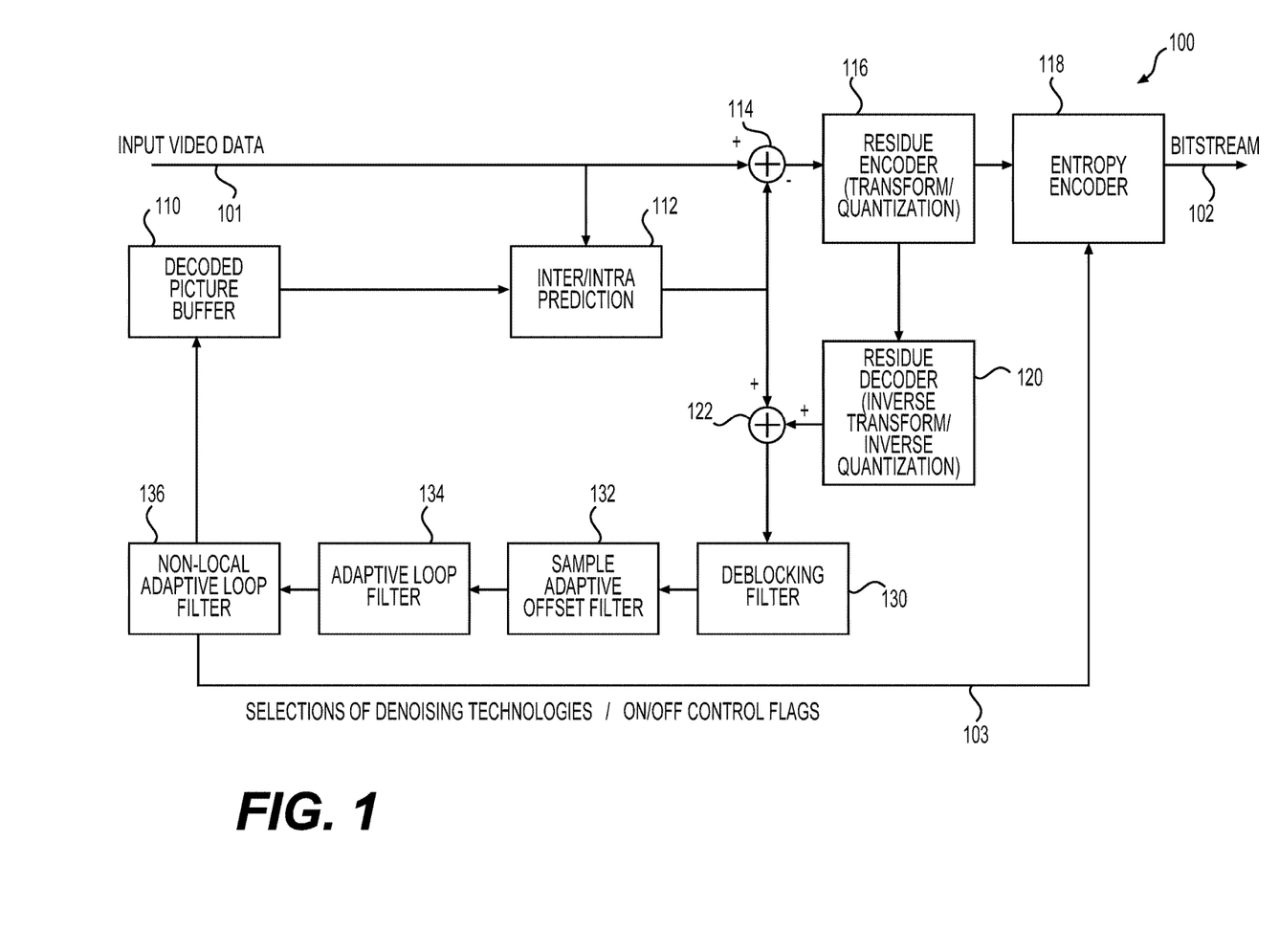
FIG. 1 shows an encoder according to an embodiment of the disclosure.

FIG. 1 shows an encoder 100 according to an embodiment of the disclosure. The encoder 100 can include a decoded picture buffer 110, an inter-intra prediction module 112, a first adder 114, a residue encoder 116, an entropy encoder 118, a residue decoder 120, a second adder 122, and one or more in-loop filters, such as a deblocking filter (DF) 130, a sample adaptive offset filter (SAO) 132, an adaptive loop filter (ALF) 134, and a non-local adaptive loop filter (NL-ALF) 136. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bitstream 102 can have a format compliant with a video coding standard, such as the Advanced Video Coding (AVC) standards, High Efficiency Video Coding (HEVC) standards, and the like.

In one example, the NL-ALF 136 can perform a non-local denoising process to reduce compression noise of a reconstructed picture, thus improving the performance of the encoder 100. For example, the NL-ALF 136 can divide the reconstructed picture into a plurality of patches (referred to as current patches). For each current patch, the NL-ALF 136 searches for similar patches (referred to as reference patches) in the reconstructed picture to form a patch group. Subsequently, the NL-ALF 136 can apply a denoising technology to each patch group to modify pixel values of one or more patches in respective patch group to reduce compression noise in those patches. The modified pixel values are returned to the picture to form a filtered picture. In addition, it cannot be guaranteed that processed pixels in the filtered picture are better in terms of noise level than corresponding unfiltered pixels in the reconstructed picture. Accordingly, the NL-ALF 136 can adaptively determine for different blocks (regions) in the filtered picture whether a block would adopt the processed pixel values or retain the unfiltered pixel values of the reconstructed picture. An on/off control flag can be employed for signaling the adaptive adoption of the processed pixel values in a respective block.

Particularly, according to the disclosure, the NL-ALF 136 can employ a parallel processing method to speed up the patch group forming process. For example, searching for similar reference patches for different current patches can be performed in parallel. In addition, according to the disclosure, the NL-ALF 136 can select a denoising technology from multiple candidate non-local denoising technologies according to a characteristic of a patch group or a picture region, and apply the selected denoising technology to the respective patch group or picture region. By combining different non-local denoising technologies at the NL-ALF 136, quality of a denoised picture in terms of compression noise level can be further improved compare with using only one denoising technology in the NL-ALF 136. For example, the multiple candidate non-local denoising technologies can include a non-local means (NLM) denoising technology, a non-local low-rank (NLLR) denoising technology, a block matching and three-dimensional (BM3D) filtering denoising technology, a three-dimensional discrete cosine transform (3D-DCT) denoising technology, or the like.

In FIG. 1, the decoded picture buffer 110 stores reference pictures for motion estimation and motion compensation performed at the inter-intra prediction module 112. The inter-intra prediction module 112 performs inter picture prediction or intra picture prediction to determine a prediction for a block of a current picture during the video compression process. A current picture refers to a picture in the input video data 101 that is being processed in the inter-intra prediction module 112. The current picture can be divided into multiple blocks with a same or different size for the inter or intra prediction operations.

In one example, the inter-intra prediction module 112 processes a block using either inter picture coding techniques or intra picture coding techniques. Accordingly, a block encoded using inter picture coding is referred to as an inter coded block, while a block encoded using intra picture coding is referred to as an intra coded block. The inter picture coding techniques use the reference pictures to obtain a prediction of a currently being processed block (referred to as a current block). For example, when encoding a current block with inter picture coding techniques, motion estimation can be performed to search for a matched region in the reference pictures. The matched region is used as a prediction of the current block. In contrast, the intra picture coding techniques employ neighboring pixels of a current block to generate a prediction of the current block. The neighboring pixels and the current block are within a same picture. The predictions of blocks are provided to the first and second adders 114 and 122.

The first adder 114 receives a prediction of a block from the inter-intra prediction module 112 and original pixels of the block from the input video data 101. The adder 114 then subtracts the prediction from the original pixel values of the block to obtain a residue of the block. The residue of the block is transmitted to the residue encoder 116.

The residue encoder 116 receives residues of blocks, and compresses the residues to generate compressed residues. For example, the residue encoder 116 may first apply a transform, such as a discrete cosine transform (DCT), wavelet transform, and the like, to received residues corresponding to a transform block and generate transform coefficients of the transform block. Partition of a picture into transform blocks can be the same as or different from partition of the picture into prediction blocks for inter-intra prediction processing.

Subsequently, the residue encoder 116 can quantize the coefficients to compress the residues. The quantization can be controlled with a quantization parameter (QP). A QP indicates a step size for associating the transform coefficients with a finite set of steps. A larger QP value represents bigger steps that crudely approximate the transform such that most of signals in the transform block can be captured by fewer coefficients. In contrast, a smaller QP value can more accurately approximate the transform, however, at a cost of increased bit number for encoding the residues. Accordingly, a larger QP can induce more distortion or compression noise into a picture resulted from the video compression process. The compressed residues (quantized transform coefficients) are transmitted to the residue decoder 120 and the entropy encoder 118.

The residue decoder 120 receives the compressed residues and performs an inverse process of the quantization and transformation operations performed at the residue encoder 116 to reconstruct residues of a transform block. Due to the quantization operation, the reconstructed residues are similar to the original resides generated from the adder 114 but typically are not the same as the original version.

The second adder 122 receives predictions of blocks from the inter-intra prediction module 112 and reconstructed residues of transform blocks from the residue decoder 120. The second adder 122 subsequently combines the reconstructed residues with the received predictions corresponding to a same region in the picture to generate reconstructed video data. The reconstructed video data can then, for example, be transferred to the DF 130.

In one example, the DF 130 applies a set of low-pass filters to block boundaries to reduce blocking artifacts. The filters can be applied based on characteristics of reconstructed samples on both sides of block boundaries in a reconstructed picture as well as prediction parameters (coding modes or motion vectors) determined at the inter-intra prediction module 112. The deblocked reconstructed video data can then be provided to the SAO 132. In one example, the SAO 132 receives the deblocked reconstructed video data and categorizes pixels in the reconstructed video data into groups. The SAO 132 can then determine an intensity shift (offset value) for each group to compensate intensity shifts of each group. The shifted reconstructed video data can then be provided from the SAO to the ALF 134. In one example, the ALF 134 is configured to apply a filter to reconstructed video data to reduce coding artifacts in the temporal domain. For example, the ALF 134 selects a filter from a set of filter candidates and applies the selected filter to a region of the reconstructed video data. In addition, the ALF 134 can be selectively turned on or off for each block of the reconstructed video data. The processed reconstructed video data can then be transmitted to the NL-ALF 136.

As described above, the NL-ALF 136 can process the received reconstructed video data using multiple non-local denoising techniques to reduce compression noise in the reconstructed video data. In one example, the NL-ALF 136 can select a target denoising technology from multiple non-local technologies, and apply the selected target denoising technology to a respective patch group or picture region. The NL-ALF 136 can accordingly signal selections of the denoising technologies for different patch groups or picture regions to a decoder such that the decoder can use a same denoising technology to process a respective patch group or picture region. As a result, a reference picture consistent between the encoder 100 and the decoder can be acquired at the decoder. As shown in FIG. 1, selections of denoising technologies 103 are transmitted to the entropy encoder 118 in one example.

In alternative examples, no signaling of selections of denoising technologies is performed at the encoder 200. The encoder 100 and the decoder can operate coordinately according to an agreement, such as a video coding standard.

In addition, the NL-ALF 136 can determine whether the non-local adaptive filtering is applied for a block in a denoised picture. For example, the NL-ALF 136 processes the received reconstructed video data and generates filtered video data. The NL-ALF 136 can then compare a filtered block of the filtered video data with a corresponding block of the received reconstructed video data to determine whether a distortion of the filtered block with respect to an original picture has been improved. When the distortion of the filtered block is improved, the pixel values of this filtered block can be adopted for forming the denoised picture. Otherwise, the pixel values of the corresponding block of the received reconstructed video data are adopted in the denoised picture. Accordingly, the denoised picture can be constructed based on the decision of whether to adopt filtered pixel values for a respective block in the denoised picture. The denoised picture can then be stored to the decoded picture buffer 110.

An on/off control flag can be employed to signal the above decision for the respective block to a decoder such that the decoder can process the block in the same way. As shown in FIG. 1, on/off control flags 103 indicating whether non-local adaptive loop filtering is applied to respective blocks are transmitted to the entropy encoder 118 in one example.

The entropy encoder 118 receives the compressed residues from the residue encoder 116. In some examples, the entropy encoder 118 also receives the selections of denoising technologies and the on/off control flags 103 from the NL-ALF 136. The entropy encoder 118 may also receive other parameters and/or control information, such as intra prediction mode information, motion information, quantization parameters, and the like. The entropy encoder 118 encodes the received parameters or other information to form the bitstream 102. The bitstream 102 including data in a compressed format can be transmitted to a decoder via a communication network, or transmitted to a storage device (e.g., a non-transitory computer-readable medium) where video data carried by the bitstream 102 can be stored.

Figure 2:
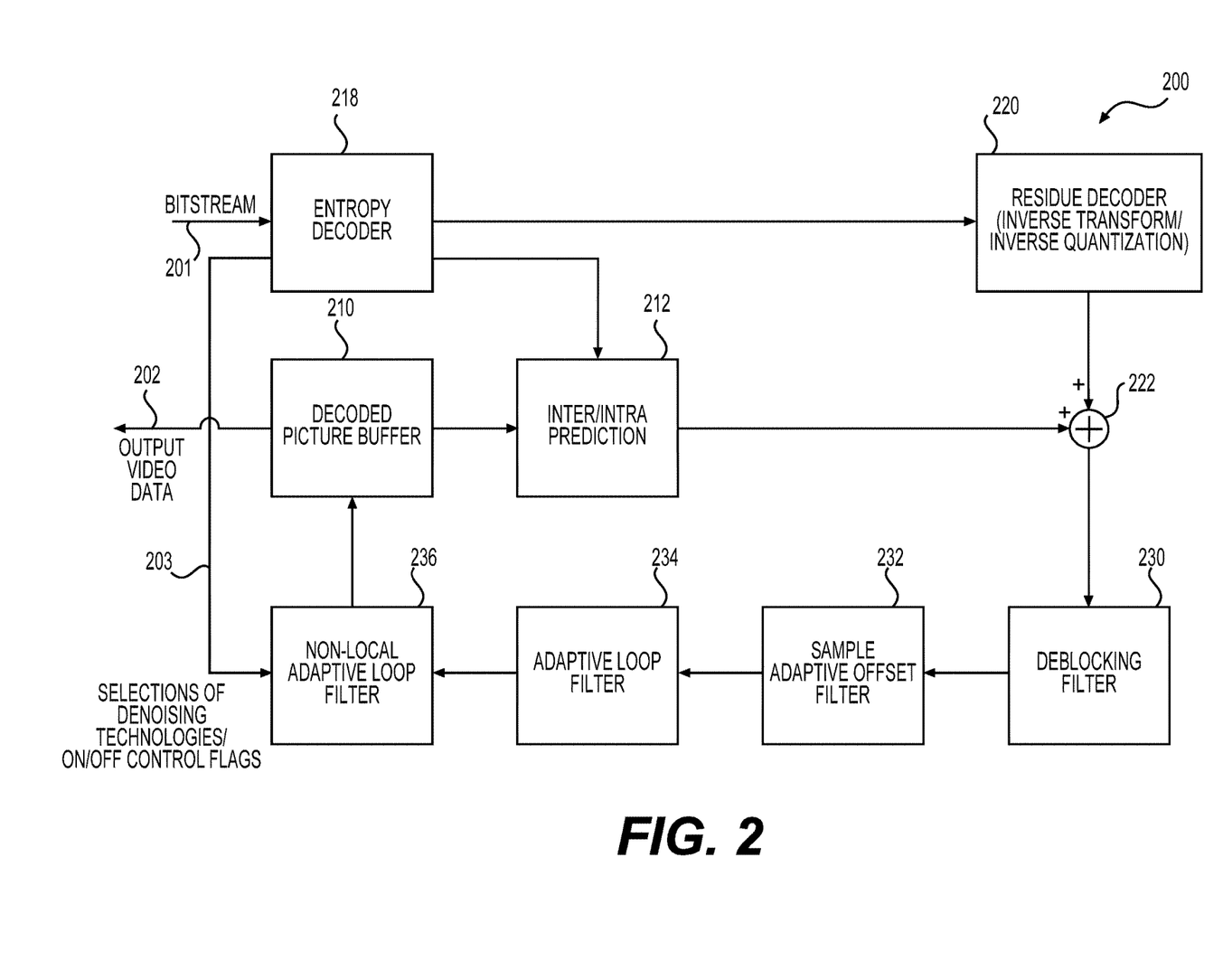
FIG. 2 shows a decoder according to an embodiment of the disclosure.

FIG. 2 shows a decoder 200 according to an embodiment of the disclosure. The decoder 200 includes an entropy decoder 218, a residue decoder 220, a decoded picture buffer 210, an inter-intra prediction module 212, an adder 222, and one or more in-loop filters, such as a DF 230, an SAO 232, an ALF 234, and a NL-ALF 236. Those components are coupled together as shown in FIG. 2. In one example, the decoder 200 receives a bitstream 201 from an encoder, such as the bitstream 102 from the encoder 100, and performs a decompression process to generate output video data 202. The output video data 202 can include a sequence of pictures that can be displayed, for example, on a display device, such as a monitor, a touch screen, and the like.

Similar to the encoder 100 in FIG. 1 example, the decoder 200 employs the NL-ALF 236, which has a similar function as the NL-ALF 136, to denoise a reconstructed picture to obtain a filtered picture. For example, the NL-ALF 236 can perform a non-local denoising process similar to that performed by the NL-ALF 136. Particularly, the NL-ALF 236 can employ a similar parallel processing method to form patch groups as performed at the NL-ALF 136. Similarly, the NL-ALF 236 can employ a same non-local denoising technology to process a patch group as selected and performed for the same patch group at the NL-ALF 136.

In examples that selections of denoising technologies 203 are explicitly signaled from the encoder 100 to the decoder 200 as shown in FIG. 2, the NL-ALF 236 can skip operations of selecting from multiple denoising technologies for a patch group or a picture region as performed at the NL-ALF 136, and take a selection of denoising technology for the respective patch group or picture region signaled from the encoder 100.

In examples that no signaling of selections of denoising technologies is performed between the encoder 100 and the decoder 200, the NL-ALF 236 can perform the same operations for selecting from multiple denoising technologies as performed at the NL-ALF 136 to determine a selection of the denoising technology for a patch group or a picture region. The NL-ALF 236 can perform the same operations for selecting from multiple denoising technologies as performed at the NL-ALF 136 according to an agreement with the NL-ALF 136, such as a video coding standard, or a pre-configuration communicated during an initial communication between the NL-ALF 136 and the NL-ALF 236.

Additionally, different from the NL-ALF 136 in FIG. 1 example, the NL-ALF 236 receives on/off control flags 203 from an encoder, and accordingly determines which blocks of pixel values in the filtered picture are to be included or excluded in a denoised picture. For example, when a control flag 203 of a block is in a state of on, filtered pixel values of the block in the filtered picture are adopted to the corresponding block of the denoised picture, while when a control flag 203 of a block is in a state of off, pixel values of the block of in the reconstructed picture are adopted.

The entropy decoder 218 receives the bitstream 201 and performs a decoding process which is an inverse process of the encoding process performed by the entropy encoder 118 in FIG. 1 example. As a result, compressed residues, prediction parameters, selections of denoising technologies and on/off control flags 203, and the like, are obtained. The compressed resides are provided to the residue decoder 220, and the prediction parameters are provided to the inter-intra prediction module 212. The inter-intra prediction module 212 generates predictions of blocks of a picture based on the received prediction parameters, and provides the predictions to the adder 222. The decoded picture buffer 210 stores reference pictures useful for motion compensation performed at the inter-intra prediction module. The reference pictures, for example, can be received from the NL-ALF 236. In addition, reference pictures are obtained from the decoded picture buffer 210 and included in the picture video data 202 for displaying to a display device.

The residue decoder 220, the adder 222, the DF 230, the SAO 232, and the ALF 234 are similar to the residue decoder 120, the second adder 122, the DF 130, the SAO 132, and the ALF 134 in terms of functions and structures. Description of those components is omitted.

The employment of a non-local adaptive loop filter, such as the NL-ALFs 136 and 236, in a decoder or encoder reduces a noise level in reconstructed video data, resulting in high quality output pictures. In addition, when those high quality pictures are used as reference pictures for encoding succeeding pictures, bit rate for transmission of the compressed pictures can be decreased. Therefore, denoising techniques disclosed herein for improving performance of a NL-ALF can improve performance and capability of a decoder or encoder which includes the NL-ALF.

While the FIG. 1 and FIG. 2 examples show a series of filters 130, 132, and 134, or 230, 232, and 234, that are included in the encoder 100 or decoder 200, it should be understood that none or fewer of such filters can be included in an encoder or decoder in other embodiments. In addition, the position of the NL-ALF 136 or 236 with respect to other filters can be different from what is shown in the FIG. 1 or FIG. 2 examples. For example, the NL-ALF 136 can be arranged in front of other filters so that it is directly coupled to the adder 122, or at the end of the series of filters, or among the series of filters.

In various embodiments, the NL-ALFs 136 and 236 can be implemented with hardware, software, or combination thereof. For example, the NL-ALF 136 or 236 can be implemented with one or more integrated circuits (ICs), such as an application specific integrated circuit (ASIC), field programmable gate array (FPGA), and the like. For another example, the NL-ALF 136 or 236 can be implemented as software or firmware including instructions stored in a computer readable non-volatile storage media. The instructions, when executed by a processing circuit, causing the processing circuit to perform functions of the NL-ALF 136 or 236.

It is noted that the NL-ALFs 136 and 236 implementing the denoising techniques disclosed herein can be included in other decoders or encoders that may have similar or different structures from what is shown in FIG. 1 or FIG. 2. In addition, the encoder 100 and decoder 200 can be included in a same device, or separate devices in various examples.

Figure 3:
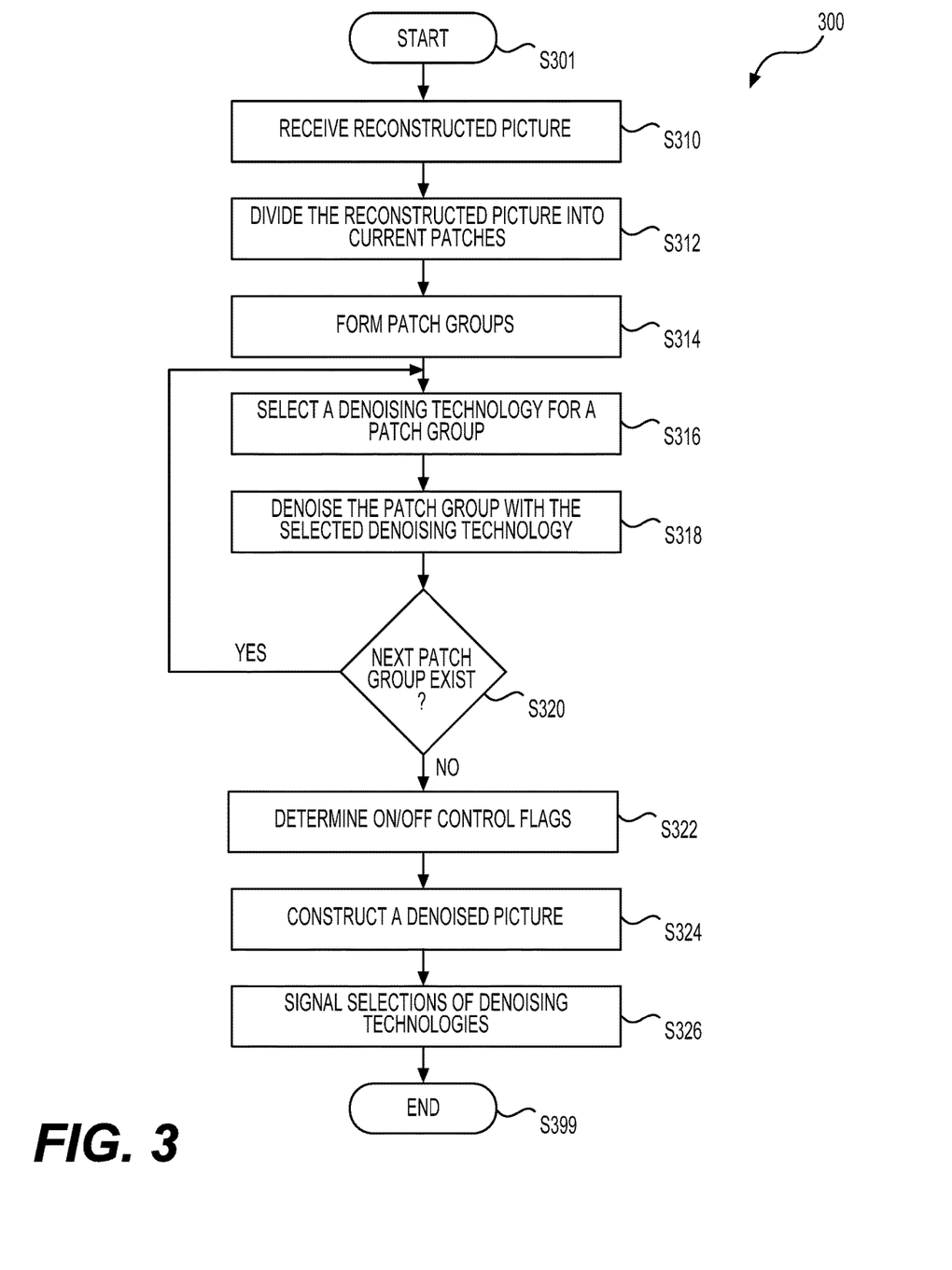
FIG. 3 shows an example denoising process for denoising a reconstructed picture according to an embodiment of the disclosure.

FIG. 3 shows an example denoising process 300 for denoising a reconstructed picture according to an embodiment of the disclosure. The denoising process 300 can be performed at the NL-ALF 136 in the FIG. 1 example. The FIG. 1 example is used to explain the denoising process 300. The denoising process 300 starts from S301 and proceeds to S310.

At S310, a reconstructed picture is received at the NL-ALF 136. For example, the second adder 122 receives predictions from the inter-intra prediction module 122, and residues from the residue decoder 120, and combines the predictions and residues to generate reconstructed video data. In various embodiments of the denoising process 300, the reconstructed video data can correspond to a picture, a frame, a slice of a picture, or a predefined region of a picture. Accordingly, a reconstructed picture corresponding to the reconstructed video data, can refer to a picture, a frame, a slice of a picture, or a predefined region of a picture, and the like, in this disclosure. In addition, a filtered picture, or a denoised picture resulting from a reconstructed picture corresponding to the reconstructed video data can accordingly be used for referring a picture, a frame, a slice of a picture, or a predefined region of a picture, and the like in this disclosure. Depending on a number of in-loop filters employed and a position of the NL-ALF 136 among those in-loop filters, the reconstructed video data can correspond to reconstructed video data generated from the residue decoder 120, or filtered reconstructed video data generated from a filter adjacent and previous to the NL-ALF 136.

At S312, the received reconstructed picture is divided into a plurality of patches (or image patches). In one example, the patches have a same size and shape (for example, 8×8 pixels), and are non-overlapped with each other. In other examples, the patches may have different sizes or shapes. In further examples, the patches may overlap with each other. Each patch can include a plurality of pixels corresponding to one of luma component or chroma component, and is referred to as a current patch.

At S314, patch groups for each current patch can be formed. In some embodiments, the patch groups can be formed without a parallel processing method. Alternatively, in some embodiments, the patch groups can be formed with a parallel processing method. For example, a plurality of similar patches (reference patches) can be found for each current patch in the reconstructed picture, or in a search window within the reconstructed picture (for example, a search grid having 33×33 candidate positions). In one example, each reference patch has a similar shape and size as the respective current patch. In addition, the reference patches can overlap each other, and the reference patches and the respective current patch can overlap each other. Each current patch and the respective similar reference patches can form a patch group.

In various embodiments, various search methods can be used to search for the similar reference patches for a respective current patch. In some examples, the search methods can be based on patch predictors of current patches neighboring a currently-being-processed current patch. A predictor of a current patch refers to a reference patch included in a patch group of this current patch. One or multiple most similar predictors of a current patch neighboring a currently-being-processed current patch can be used to guide a search process of the currently-being-processed current patch. Thus, dependency can exist between a currently-being-processed current patch and previously processed neighboring current patch when predictor-based search methods are employed for each current patch. Accordingly, in some examples, in order to speed up the patch group forming process, the parallel processing method can be employed to process different current patches in parallel by removing the dependency among the different current patches.

In one example, for each current patch, the K most similar patches are found, and the current patch and the respective K most similar patches form a patch group including K+1 patches. K indicates a number of similar patches corresponding to a current patch (for example, K=15), and K can have different values for different current patches or patch groups. In one example, similar matches found for a respective current patch are not the most similar reference patches but reference patches having a similarity measure above a threshold. The similarity measure can be obtained based on a similarity metric. In one example, patch groups are formed for a portion of the current patches instead of for each current patch.

In various embodiments, various similarity metrics can be used to measure the similarity between a current patch and a reference patch. For example, the similarity metric can be a sum of absolute differences (SAD), or a sum of square differences (SSD), between corresponding pixel values in a current patch and a corresponding reference patch. For another example, pixel values in a current patch and a corresponding reference patch can be arranged as two vectors, and a L2 norm distance between those two vectors can be used as a similarity metric.

At S316, a denoising technology can be selected from a set of at least two candidate denoising technologies for denoising a patch group. For example, the set of candidate denoising technologies can include a NLM denoising technology, a BM3D denoising technology, a NLLR denoising technology, or a 3D-DCT denoising technology. However, the candidate denoising technologies applicable for denoising patch groups are not limited to the NLM, BM3D, NLLR, or 3D-DCT technologies.

In one example, selection of a denoising technology at S316 can be based on characteristics of the patch group currently under processing. For example, different patch groups can have different characteristics such as different compression noise levels and texture properties. Different denoising technologies may be developed with different assumptions of characteristics of an image, thus a denoising technology may be more suitable for one type of patch groups than other types of patch groups. Accordingly, adaptively selecting a denoising technology for processing a patch group based on characteristics of the patch group can yield a better result than blindly applying a single denoising technology to all patch groups.

In addition, for patch groups with certain characteristics, applying a simple denoising technology with a lower power consumption level may be more power efficient than applying a more sophisticated denoising technology but having a higher power consumption level. For example, compared with the NLM denoising technology, the NLLR denoising technology may be more sophisticated than the NLM denoising technology, and can better preserve textures of patch groups. However, the NLLR denoising technology may be more computation intensive and consume more power. In a scenario that a patch group has small texture variations, applying the simple NLM denoising technology can suffice to generate a result with a quality similar to applying the complex NLLR denoising technology. Accordingly, taking both quality and power consumption into account, adaptively selecting different denoising technologies based on characteristics of different patch groups may be more power efficient compared with blindly applying a single denoising technology to all patch groups.

In various examples, selection of a denoising technology at S316 can be based on one or more of the following factors: a distortion between a current patch and reference patches in a patch group, texture of a current patch, texture of a patch group, or which color component a patch group being of. Those factors can be associated with or indicate characteristics of patch groups.

In a first example, a largest distortion between a current patch and corresponding reference patches in a patch group is used to select one denoising technology from two denoising technologies including a NLM denoising technology and a NLLR denoising technology. A distortion between two patches refers to a difference between these two patches, and can be measured with a similarity metric as used in S316 for evaluating similarity between a current patch and a candidate reference patch. A largest distortion of a patch group is a distortion between a respective current patch and a reference patch that have a lowest similarity among patches in the patch group.

Specifically, when a largest distortion of a patch group is smaller than a threshold, patches in the patch group are similar to each other, which can be interpreted as that compression noise level of the patch group is relatively low and texture variations (for example, indicated by a standard deviation (SD), or a variance of pixel values of the patch group) is minor. In contrast, when the largest distortion of the patch group is larger than the threshold, patches in the patch group are not similar to each other, which can be interpreted as that compression noise level of the patch group is relatively high, and/or texture variations are significant.

A NLM denoising technology can average a weighted sum of pixel values of different patches in a patch group to obtain a denoised pixel value. The average operations may remove information of fine textures included in the patch group. In contrast, a NLLR denoising technology may be more intelligent. For example, a NLLR denoising technology may exploit different characteristics of different patch groups and distinguish different factors (such as compression noise or texture variations) that cause the different characteristics. Thus, a NLLR denoising technology can more accurately control denoising operations over different patch groups to better preserve textures of a patch group compared with a NLM denoising technology. On the other side, a NLM denoising technology employing simple techniques may consume less power than a NLLR denoising technology that is more intelligent but requires heavier computations.

Accordingly, in one example, when the largest distortion of the patch group is smaller than the threshold, the NLM denoising technology can be selected. Otherwise, when the largest distortion of the patch group is larger than the threshold, the NLLR denoising technology can be selected. For patch groups with smaller distortions, texture variations are relatively small, and hence average operations may not produce significant defects to the patch group. The NLM denoising technology will suffice to acquire reasonable denoising results with less power consumption. For patch groups with higher distortions which may be caused by either a high compression noise level or a large texture variation, the NLLR denoising technology can better preserve textures of the patch group however consume more power.

In a second example, selection of a denoising technology for a patch group is based on types of color components of the patch group. Generally, a picture can include different color components, such as a luma component and a chroma component. A reconstructed picture of chroma component can have different characteristics from a reconstructed picture of luma component. For example, pixels of chroma component can typically have a smaller variance than pixels of luma component. Accordingly, in one example, for patch groups of luma component, the NLLR denoising technology can be selected, while for patch groups of chroma component, the NLM denoising technology can be selected.

In a third example, selection of a denoising technology for a patch group is based on textures of the patch group or a current patch of the patch group. For example, texture property of a patch group or a current patch can be indicated by a variance, or a standard deviation of pixel values of the patch group or the current patch. A patch group or a current patch with a higher variance can have higher texture variations than that with a lower variance. Accordingly, for patch groups having a variance above a threshold, or having a current patch with a variance above the threshold, the NLLR denoising technology can be selected to better preserve textures. For patch groups having a variance below the threshold, or having a current patch with a variance below the threshold, the NLM denoising technology can be selected.

In some examples, instead of selecting a denoising technology based on a single factor, a combination of multiple factors can be considered for selecting a denoising technology. For example, selection of a denoising technology for a patch group can be based on a combination of the color component factor and one of the patch group distortion factor or texture factor. For example, when the patch group is of chroma component, a NLM denoising technology can be selected. When the patch group is of luma component, selection of a denoising technology can be based on a largest distortion between a current patch and reference patches of the patch group, or based on textures of the patch group.

For another example, selection of a denoising technology for a patch group can be based on a combination of the patch group distortion factor and the texture factor. For example, when a largest patch distortion of the patch group is greater than a distortion threshold and a variance of the patch group is greater than a variance threshold, a NLLR denoising technology can be selected. Otherwise, a NLM technology can be selected.

At S318, the selected denoising technology (also referred to as the target non-local denoising technology) is applied to the respective patch group to modify pixel values of one or more patches in the respective patch group. For different denoising technology, a corresponding denoising process can be carried out accordingly for processing the respective patch group.

At S320, whether a next patch group exists is checked. When there are remaining current patches, the denoising process 300 returns to S316, and the steps of S316 and S318 are repeated for each remaining current patch. When all current patches have been processed, the denoising process 300 can proceed to S322. Additionally, after all patches have been processed, the modified pixel values of overlapping patches belonging to different patch groups can be aggregated to form a filtered picture, for example, by operations of weighted sum.

At S322, on/off control flags associated with a control block in a denoised picture are determined. The on/off control flags indicate whether the control block adopts filtered pixel values in the filtered picture or pixel values of the reconstructed picture. In various embodiments, control blocks for control of whether to adopt filtered pixel values resultant from the denoising operations at S340 can be defined or partitioned in various ways. For example, a partition of the control blocks can be consistent with a partition of coding units defined in the HEVC standard. Or, a partition of the control blocks can be consistent with a block partition used in a filter, such as the DF 130, the SAO 132, or the ALF 134, for purpose of control a filtering operation. Alternatively, the control block partition can be determined according to noise characteristics of different regions in a picture. In various examples, the control block partition information can be signaled from an encoder to a decoder, derived at a decoder, or predefined as a default configuration at both an encoder and a decoder.

At S324, the denoised picture are constructed based on the on/off control flag decisions. For control blocks associated with an on flag, filtered pixel values resulting from the denoising operations of S310-S320 are adopted for the respective control blocks, while for control blocks associated with an off flag, pixel values of the received reconstructed picture are adopted for the respective control blocks. Subsequently, a reference picture can be generated based on the denoised picture. For example, the denoised picture can be stored to the decoded picture buffer 110 to be used as a reference picture. Alternatively, depending on the position of the NL-ALF 136 among other in-loop filters, the denoised picture may first be processed by other in-loop filters before storing into the decoded picture buffer 110.

At S326, selections of denoising technologies are signaled from the encoder 100 to the decoder 200. For example, a denoising technology can be selected at S316 for each patch group. Syntax elements such as flags or indexes indicating selected denoising technologies can be generated at the NL-ALF 136, and included in the bit stream 102. The denoising process 300 proceeds to S399, and terminates at S399.

While in the above example of the denoising process 300, selection from multiple denoising technologies is performed at patch group level, selection from multiple technologies can be performed at picture level, picture sequence level, or picture region level in other examples. A picture region used as a basis for denoising technology selection can be a picture region defined in HEVC, AVC, or other video coding standards, such as a macro block, a coding block, a coding tree unit (CTU), a coding tree block (CTB), a slice, a tile, and the like. Alternatively, a picture region used as a basis for denoising technology selection can result from a partition of a picture defined by a configuration of a coding system.

Similar to parch groups, different pictures or picture regions can have different characteristics, such as different compression noise levels, or different texture properties. Accordingly, different denoising technologies can be selected based on characteristics of different pictures or picture regions to achieve better picture quality (in terms of noise level and texture preservation) and power efficiency. For example, the NL-ALF 136 can analyze original pictures in the input video data 101, and/or reconstructed picture to obtain characteristic information of a picture or a picture region. For example, by comparing a reconstructed picture region with a corresponding picture region in an original picture, a compression noise level of the reconstructed picture region can be determined. By calculating a standard deviation of an original picture region, texture property of the picture region can be estimated. Based on the obtained characteristic information of a picture or a picture region, a suitable denoising technology can be accordingly determined.

Alternatively, the NL-ALF 136 may try different denoising technologies for a picture region. By comparing a resulting filtered picture region with a corresponding original picture region, denoising results of different denoising technology over the picture region can be evaluated and compared. Accordingly, a denoising technology with a better result can be selected for the picture region.

In examples where the denoising technology selection is performed on picture level, picture sequence level, or picture region level, a denoising process similar to the denoising process 300 can be employed with some modifications. For example, a step of selecting a denoising technology based on characteristics of a picture or a picture region can be added, for example, between the steps of S310 and S312. The step of S316 for selecting a denoising technology at patch group level can be removed. At S318, denoising a patch group can use a denoising technology selected for a picture or a region that, for example, includes or overlaps the respective patch group.

In addition, at step 326, selections of denoising technologies corresponding to a picture or a picture region can be signaled. For example, syntax elements of flags or indexes indicating selections of denoising technologies can be included in the bit streams 102 or 201 in FIG. 1 or FIG. 2 example. The flag or index elements can be associated with a picture sequence, a picture, or a picture region in the respective bit stream, and signaled, for example, in sequence level, picture level, slice level, CTU level, CTB level, tile level, and the like.

In the above example of the denoising process 300, selections of denoising technologies are explicitly signaled from the encoder 100 to the decoder 200. Corresponding to this scenario, a denoising process similar to the denoising process 300 can be employed at the NL-ALF 236 of the decoder 200 with some modifications. For example, in the denoising process at the NL-ALF 236, a step of receiving selections of denoising technologies signaled from an encoder can be first performed. Subsequently, the steps of S310-S324, except the steps of S316, can be performed.

In alternative examples, no signaling for selections of denoising technologies is performed between the decoder 100 and the encoder 200. Accordingly, the decoder 200 can determine denoising technologies for processing patch groups by itself in a way similar to the encoder 100 determining denoising technologies. For example, the NL-ALF 236 can operate according to an agreement between the decoder 100 and the encoder 200. For example, the agreement can be specified by a video coding standard, or by a configuration carried in the bit stream 102 or 201 and signaled from the decoder 100 to the encoder 200. For example, the NL-ALF 236 can perform a process including steps of S310-S320, and S324 as included in the denoising process 300. Particularly, selecting a denoising technology for a patch group at NL-ALF 236 can be performed with same procedure and criterion as performed at the NL-ALF 136, such that a same denoising technology can result as at the NL-ALF 136. In case that selection of denoising technologies is performed at a picture level, or a picture region level, the NL-ALF 236 can accordingly perform the selection in a same way as the NL-ALF 136.

In some examples, a combination of explicit and implicit selection of denoising technologies can be used for signaling selection results from an encoder to a decoder and for performing selection at a decoder. Specifically, at least two candidate denoising technology groups can be created. Each candidate denoising technology group can include at least two candidate denoising technologies. For example, the candidate denoising technologies can be grouped based on their applicability to different types of pictures or picture regions that have different characteristics.

As an example, the encoder can create two candidate denoising technology groups, group A and group B. Group A can include two candidate denoising technologies {a1, a2}, and group B can include two candidate denoising technologies {b1, b2}. During an encoding process, the encoder can perform a selection process to determine a target denoising technology. For example, a first algorithm associated with group A can be performed to select one denoising technology from {a1, a2}, and a second algorithm associated with group B can be performed to select one denoising technology from {b1, b2}. The first or second algorithm can be based on methods similar to the selection methods described above. The selection can be at a picture level, a picture region level, a patch group level, and the like. Thereafter, the selected two denoising technologies from group A and group B respectively can be compared and evaluated. As a result, the one having a better performance, for example, in terms of removing noise and maintaining textures, can be finally selected to be the target denoising technology.

The encoder can then employ the combination of explicit and implicit selection to signal the selection result. For example, assuming the denoising technology b1 is selected, the encoder can signal a flag indicating group B is the group (selected group) including the final selected denoising technology b1, but without singling a specific selected technology (the denoising technology b1). At the decoder side, the decoder can receive the flag and know group B is the selected group. Accordingly, based on an agreement with the encoder, the decoder can perform the second algorithm associated with group B to select a denoising technology (the denoising technology b1) from group B. Usage of the combination of explicit and implicit selection can reduce transmission rate required for signaling a selected target denoising technology from the encoder to the decoder.

Figure 4:
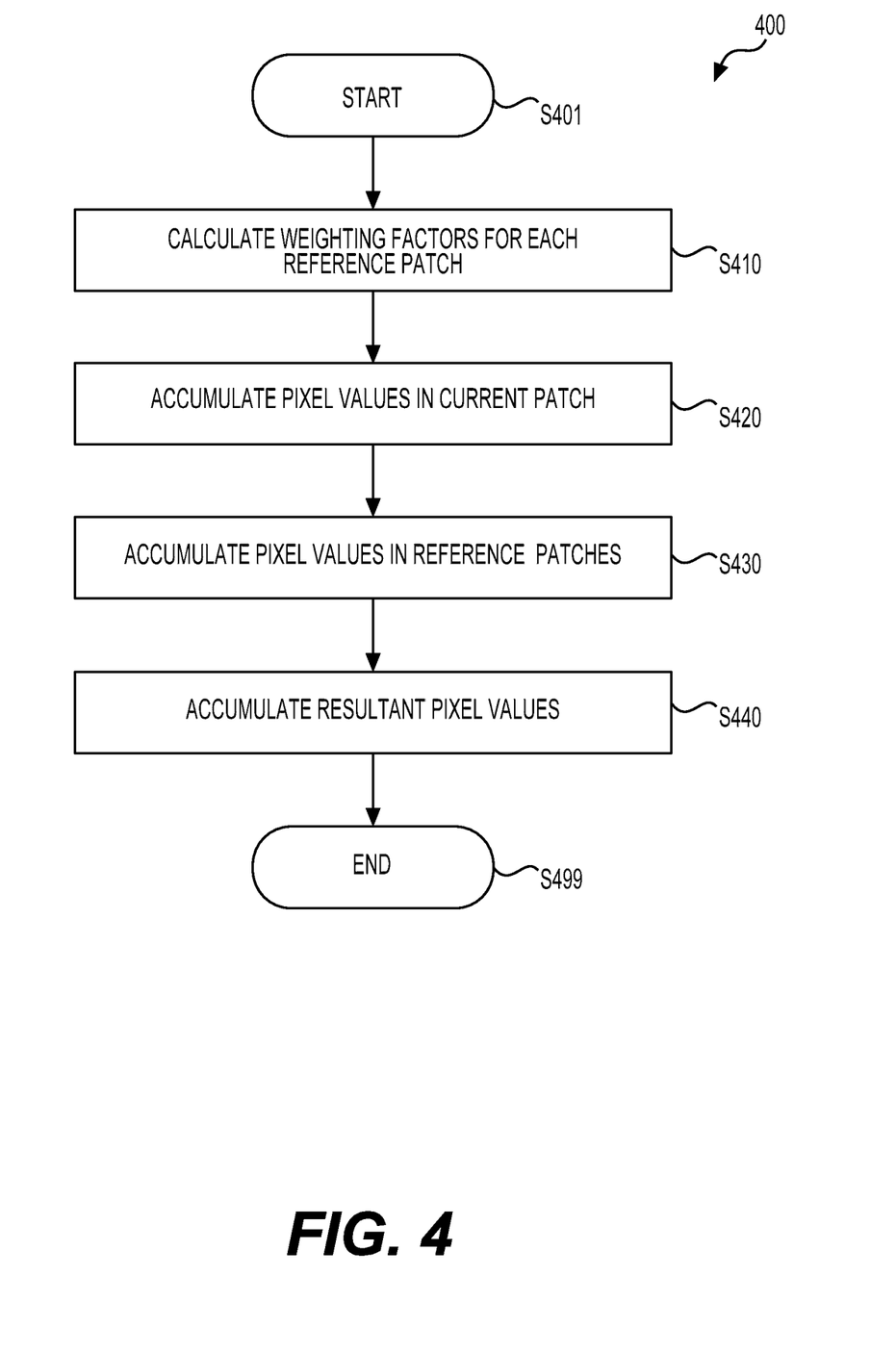
FIG. 4 shows an exemplary process of denoising a patch group with a selected denoising technology according to an embodiment of the disclosure.

FIG. 4 shows an exemplary process 400 of denoising a patch group with a selected denoising technology according to an embodiment of the disclosure. The process 400 can be performed in place of S318 in the process 300 to obtain a filtered patch group. The selected denoising technology is a NLM denoising technology. The NL-ALF 136 is used as an example to explain the process 400. The process 400 starts from S401 and proceeds to S410. Before starting of the process 400, patch groups corresponding to reconstructed video data received at the NL-ALF 136 can have already been formed, and the NLM denoising technology can have been determined for a currently-being-processed patch group, referred to as a current patch group.

At S410, weighting factors for each reference patch in the current patch group are calculated. The weighting factor of a reference patch can be calculated based on a similarity between the reference patch and a current patch in the current patch group. The more a reference patch is similar to the current patch, the larger the weighting factor of the reference patch. In one example, the weighting factors can be determined using the following expression, $$w_{i,j}=e^{-(SSE/Var)}.$$

In the above expression, i and j are patch indexes, $w_{i,j}$ represents a weighting factor of a reference patch j with respect to the current patch i; SSE represents an average of sum of square errors between corresponding pixel values in the patches i and j, and indicates the similarity degree between the patches i and j; Var represents a variance of compression noise in the current patch group. For example, Var can equal to a square of a standard deviation (SD) of compression noise of the current patch group. Var can indicate strength of the filtering operation. The higher the compression noise level, the higher the Var, and the larger the corresponding weighting factors of the current patch group. In one example, the Var is derived based on a compression noise model.

At S420, pixel values of the current patch are accumulated. In one example, the accumulation of the current patch pixel values is performed in a way that weighted pixel values of corresponding pixels in each reference patch are aggregated to corresponding pixel values of the current patch based on the respective weighting factors of each reference patch. In one example, the accumulation is performed according to the following expression, $$x_{Ai}(p)=w_o \cdot x_i(p)+\Sigma_{j=1}^{K} w_{i,j} \cdot y_j(p),$$

where p is a pixel index, $x_{Ai}(p)$ represents an aggregated pixel value of the pixel, p, in the current patch i resultant from the aggregation, $x_i(p)$ represents an original pixel value of the pixel, p, in the current patch i before the aggregation, $w_o$ represents the weight of the original pixel value, $y_j(p)$ represents an original pixel value of the pixel, p, in a reference patch j.

At S430, pixel values of each reference patch of the current patch group are accumulated. In one example, the accumulation of pixel values of a reference patch is performed in a way that a weighted pixel value of a corresponding pixel in the current patch are added to a corresponding pixel value of the reference patch based on the weighting factors of the reference patch. In one example, the accumulation is performed according to the following expression, $$y_{Aj}(P)=w_o \cdot y_j(p)+w_{i,j} \cdot x_{Ai}(p),$$

where p is a pixel index, $y_{Aj}(p)$ represents an aggregated pixel value of the pixel, p, in a reference patch j resultant from the aggregation, $x_{Ai}(p)$ represents the aggregated pixel value of the pixel, p, in the current patch i resultant from the aggregation at S420, $y_j(p)$ represents an original pixel value of the pixel, p, in the reference patch j, $w_o$, represents the weight of the original pixel value. In another embodiment, $x_i(p)$ in the current patch i is used in the above accumulation instead of $x_{Ai}(p)$.

At S440, the accumulated pixel values of the current patch and the reference patches resulting from S420 and S430 are accumulated to corresponding pixels in a picture, referred to as an accumulation picture. As the reference patches and the current patch in the current patch group can overlap each other, a pixel in the accumulation picture may receive pixel values from multiple patches, either the current patch or one or more reference patches. Accordingly, accumulated pixel values in the accumulation picture can be normalized by dividing the accumulated pixel values with a sum of weights of each element of the accumulated pixel values. Alternatively, a normalization operation can be performed after all patch groups are processed after the step of S320 in the process 300. The process 400 proceeds to S499 and terminates at S499.

Figure 5:
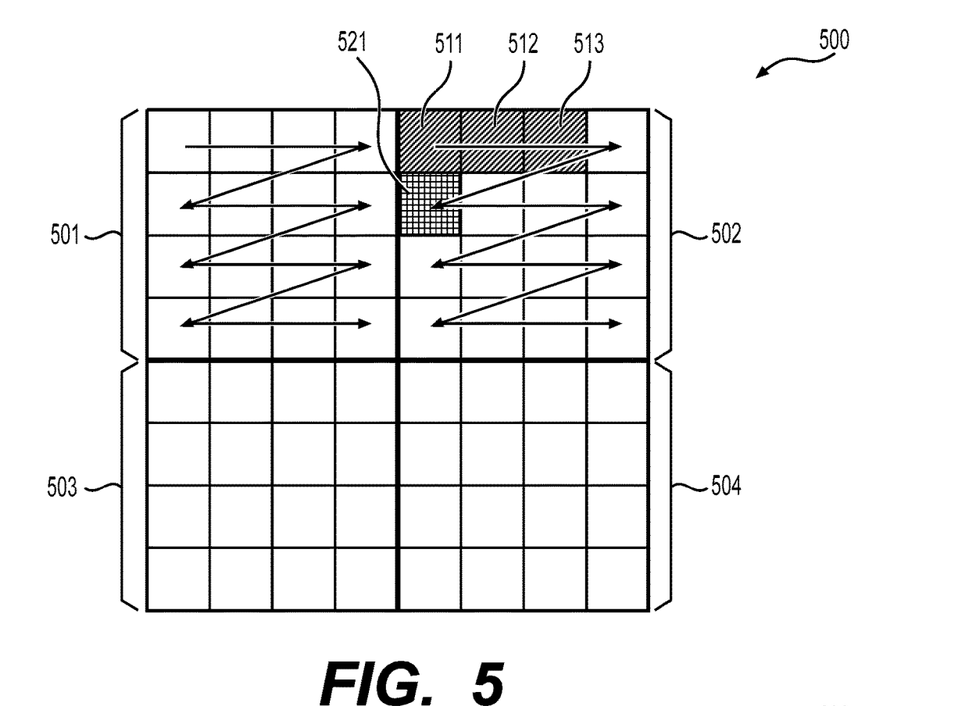
FIG. 5 illustrates a first exemplary parallel processing method for forming patch groups according to an embodiment of the disclosure.

FIG. 5 illustrates a first exemplary parallel processing method for forming patch groups according to an embodiment of the disclosure. The first parallel processing method can be used at the step of S314 to form patch groups for different current patches in a reconstructed picture in parallel.

For example, at the step of S310 in the process 300, a reconstructed picture 500 as shown in FIG. 5 can be received. Then, at the step of S312, the reconstructed picture 500 can be divided into a plurality of current patches, such as rectangular patches 511-513 and 521. Subsequently, the first parallel processing method can be performed. The first parallel processing method can include two stages.

At a first stage, the reconstructed picture 500 can be partitioned into multiple parallel processing regions. Each parallel processing region can include a subset of the current patches of the reconstructed picture 500. In FIG. 5, as indicated by the thick solid lines, the reconstructed picture 500 is partitioned into 4 parallel processing regions 501-504 each include 16 current patches. In alternative examples, the parallel processing regions may have different size and include different number of current patches.

At a second stage, at least two of the parallel processing regions 501-504 can be processed in parallel. For example, the parallel processing region 501 and 502 can be processed in parallel. For example, current patches in the parallel processing region 501 can be processed sequentially, for example, in an order of row by row and from left to right as shown in FIG. 5, to form a patch group for each current patch in the parallel processing region 501. While processing each current patch in the parallel processing region 501, a predictor-based search algorithm can be used to search for a set of similar reference patches for a respective current patch. At the same time, current patches in the parallel processing region 502 can be processed in a similar way as in the parallel processing region 502 as shown in FIG. 5. A same or different predictor-based search algorithm can be used for processing the current patches in the parallel processing region 502.

In addition, when processing a current patch at a parallel processing region 501 or 502, usage of patch predictors for processing this current patch can be limited to be predictors of current patches within a same parallel processing region as this current patch. For example, the current patch 521 is under processing to form a patch group of the current patch 521. The predictor-based search algorithm for processing the current patch 521 can use predictors of the current patches 511-513 to guide a search process. The current patches 511-513 are in the neighborhood of the current patch 521 and within the same parallel processing region as the current patch 521.

For example, each current patch 511-513 can have a predictor that is the most similar to the respective current patch 511-513 among all patches in a respective patch group. Those three the most similar predictors corresponding to the three neighboring current patches 511-513 can be referred to as guide predictors. In one example, the three guide predictors are first compared with the current patch 521, and the guide predictor that is the most similar to the current patch 521 can be used as a center position to define a search window. The search window can include a plurality of candidate positions for searching for reference patches for the current patch 521. In another example, multiple search windows can be defined each with one of the guide predictors as a center position.

After one or more search windows are defined, a search process can be performed over candidate positions included in the search windows to search for similar reference patches for the current patch 521. For example, a full search or a fast block matching motion estimation process can be performed in each search windows. Examples of the fast block matching motion estimation process can include three step search, diamond search, four step search, hexagon-based search, 2D-log search, and the like.

As described above, processing for the current patch 521 uses predictors of the current patches that are within the parallel processing region 502, and does not use predictors of current patches that are outside of the parallel processing region 502. Other current patches within the parallel processing region 502 can be processed in a similar way as the current patch 521 without usage of predictors of current patches outside the parallel processing region 502. In this way, processing of the parallel processing region 502 can be independent from that of other parallel processing regions 501, 503, or 504. Similarly, each of the parallel processing regions 501, 503, or 504 can be processed independently and in parallel with each other.

In one example, the partition of parallel processing regions in FIG. 5 can be the same as the partition of control units for implementing the on/off control flags as described above. In this way, when a control unit is set with an off control flag, at the side of the decoder 200, processing at the steps of S314-S318 in the process 300 for this control unit can be skipped. Particularly, because the control units are independent from each other in terms of usage of patch predictors, the predictor-based search algorithm can be applied in other control units neighboring this control unit with the off control flag, and would not be affected by the off control flag.

Figure 6:
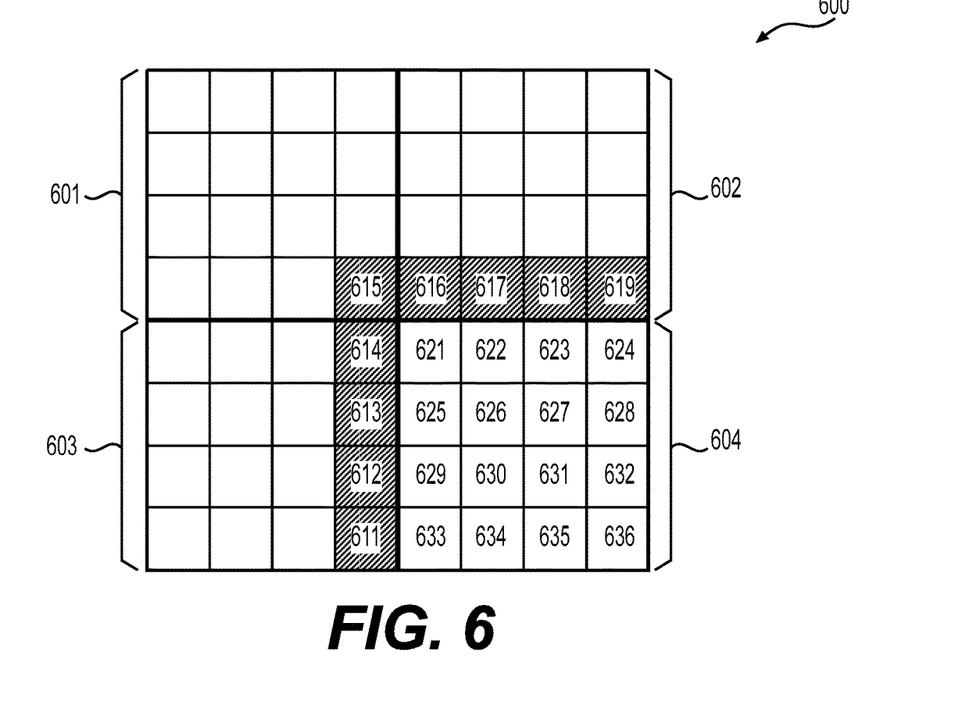
FIG. 6 illustrates a second exemplary parallel processing method for forming patch groups according to an embodiment of the disclosure.

FIG. 6 illustrates a second exemplary parallel processing method for forming patch groups according to an embodiment of the disclosure. The second parallel processing method can be used at the step of S314 to form patch groups for different current patches in a reconstructed picture in parallel.

For example, at the step of S310 in the process 300, a reconstructed picture 600 as shown in FIG. 6 can be received. Then, at the step of S312, the reconstructed picture 600 can be divided into a plurality of current patches, such as rectangular patches 611-619 and 621-636. Subsequently, the second parallel processing method can be performed. The second parallel processing method can include two stages.

At a first stage, similar to the first stage of the first parallel processing method, the reconstructed picture 600 can be partitioned into multiple parallel processing regions. Each parallel processing region can include a subset of the current patches of the reconstructed picture 600. In FIG. 6, as indicated by the thick solid lines, the reconstructed picture 600 is partitioned into 4 parallel processing regions 601-604 each include 16 current patches. In alternative examples, the parallel processing regions may have different size and includes different number of current patches.

At a second stage, the parallel processing regions 601-604 can be processed sequentially, for example, in an order of 601, 602, 603, and 604. However, within each of the parallel processing regions 601-604, the current patches can be processed in parallel with a predictor-based search algorithm. Particularly, processing of a current patch does not use predictors of neighboring current patches that are included in a same parallel processing region as the currently-being-processed current patch. Instead, processing of a current patch uses predictors of current patches outside of a parallel processing region that includes the currently-being-processed current patch. Thus, current patches within a same parallel processing region are processed independently.

As an example, the parallel processing region 604 is under processing that includes 16 current patches 621-636. Processing of each current patch 621-636 can be performed in parallel. The processing of each current patch 621-636 can be based on a predictor-based algorithm. Predictors used during the processing can be reference patches of one or more of the current patches 611-619 that neighbor the parallel processing region 604. In alternative examples, predictors used during the processing of the parallel processing region 604 can be that of current patches outside the parallel processing region 604 other than the current patches 611-619.

It is to be understood that, in other examples, it is possible that the parallel processing regions 601-603 may be processed in any order, sequentially or in parallel. The processing order of the parallel processing regions 601-603 does not affect processing in parallel the current patches 621-636 in the parallel processing region 604.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for denoising a reconstructed picture in a video coding system, comprising:
    dividing the reconstructed picture into a plurality of patches:
    for a current patch from the plurality of patches, identifying a patch group that includes the current patch and one or more reference patches from the plurality of patches, a similarity measure between any one of the one or more reference patches and the current patch, calculated based on differences between corresponding pixel values, being above a first threshold;
    selecting a target non-local denoising technology from two or more candidate non-local denoising technologies for processing the current patch according to the one or more reference patches; and
    denoising the current patch according to the one or more reference patches with the target non-local denoising technology.

2. The method of claim 1, wherein the two or more candidate non-local denoising technologies include at least one of
    a non-local low-rank denoising technology,
    a non-local means denoising technology,
    a block matching and three-dimensional filtering denoising technology, or
    a three-dimensional discrete cosine transform denoising technology.

3. The method of claim 1, wherein the selecting the target non-local denoising technology is performed according to one or more characteristics of video data to which the reconstructed picture belongs.

4. The method of claim 3, wherein the selecting the target non-local denoising technology is performed according to a characteristic of the current patch or the one or more reference patches of the patch group.

5. The method of claim 3, wherein the selecting the target non-local denoising technology includes:
    selecting the target non-local denoising technology based on one or a combination of a distortion between the current patch and a reference patch in the patch group, texture of the current patch,
    texture of the patch group, or
    which color component the patch group being of.

6. The method of claim 3, wherein the selecting the target non-local denoising technology includes:
    when a largest distortion between the current patch and the one or more reference patches in the patch group is smaller than a second threshold, selecting a non-local means denoising technology as the target non-local denoising technology; and
    when the largest distortion between the current patch and the one or more reference patches in the patch group is greater than the second threshold, selecting a non-local low-rank denoising technology as the target non-local denoising technology.

7. The method of claim 3, wherein the selecting the target non-local denoising technology includes:
    selecting a non-local means denoising technology as the target non-local denoising technology when the reconstructed picture is of a chroma component; and
    selecting a non-local low-rank denoising technology as the target non-local denoising technology when the reconstructed picture is of a luma component.

8. The method of claim 3, wherein the selecting the target non-local denoising technology includes:
    when a variance of the current patch or patches in the patch group is smaller than a third threshold, selecting a non-local means denoising technology as the target non-local denoising technology; and
    when the variance of the current patch or the patches in the patch group is greater than the third threshold, selecting a non-local low-rank denoising technology as the target non-local denoising technology.

9. The method of claim 3, wherein the selecting the target non-local denoising technology includes:
    selecting the target non-local denoising technology for processing the reconstructed picture or a picture region of the reconstructed picture according to a characteristic of the reconstructed picture or the picture region of the reconstructed picture.

10. The method of claim 1, wherein a syntax element indicating the target non-local denoising technology is signaled from a video encoder to a video decoder.

11. The method of claim 10, wherein the syntax element is incorporated at patch level, block level, coding tree block (CTB) level, coding tree unit (CTU) level, slice level, or sequence level of a bitstream.

12. The method of claim 1, wherein
the two or more candidate non-local denoising technologies are configured into at least two candidate groups, and
the selecting the target non-local denoising technology includes:
  determining a selected group from the at least two candidate groups; and
  selecting, based on one or more characteristics of video data to which the reconstructed picture belongs, one candidate non-local denoising technology from the selected group as the target non-local denoising technology.

13. The method of claim 12, wherein a syntax element that indicates the selected group is signaled from a video encoder to a video decoder.

14. An apparatus for denoising a reconstructed picture in a video coding system, comprising circuitry configured to:
  divide the reconstructed picture into a plurality of patches;
  for a current patch from the plurality of patches, identify a patch group that includes the current patch and one or more reference patches from the plurality of patches, a similarity measure between any one of the one or more reference patches and the current patch, calculated based on differences between corresponding pixel values, being above a threshold;
  select a target non-local denoising technology from two or more candidate non-local denoising technologies for processing the current patch according to the one or more reference patches; and
  denoise the current patch according to the one or more reference patches with the target non-local denoising technology.

15. A non-transitory computer-readable medium storing instructions that, when executed by a video coding system, cause the video coding system to:
  divide a reconstructed picture into a plurality of patches;
  for a current patch from the plurality of patches, identify a patch group that includes the current patch and one or more reference patches from the plurality of patches, a similarity measure between any one of the one or more reference patches and the current patch, calculated based on differences between corresponding pixel values, being above a threshold;
  select a target non-local denoising technology from two or more candidate non-local denoising technologies for processing the current patch according to the one or more reference patches; and
  denoise the current patch according to the one or more reference patches with the target non-local denoising technology.

16. A method, comprising:
receiving a reconstructed picture;
partitioning the reconstructed picture into a plurality of patches;
partitioning the reconstructed picture into parallel processing regions that each include a subset of the plurality of patches;
processing the parallel processing regions to form patch groups for the patches, including searching for one or more corresponding reference patches similar to a particular patch with a predictor-based search algorithm to form a particular patch group, a similarity measure between any one of the one or more corresponding reference patches and the particular patch in the particular patch group, calculated based on differences between corresponding pixel values, being above a threshold; and
for the particular patch group that includes the particular patch and the one or more corresponding reference patches,
  selecting a target non-local denoising technology from two or more candidate non-local denoising technologies, and
  denoising the particular patch according to the one or more corresponding reference patches with the target non-local denoising technology,
wherein
at least two of the parallel processing regions are processed in parallel, and
each of the at least two of the parallel processing regions is processed without usage of patch predictors outside the respective parallel processing region, a patch predictor of a currently-being-processed patch being a reference patch in a patch group for a neighboring patch of the currently-being-processed patch.

17. The method of claim 16, further comprising:
sequentially processing patches included in each of the at least two of the parallel processing regions to form patch groups with the predictor-based search algorithm.

18. The method of claim 16, further comprising:
denoising the patch groups to generate a filtered picture; and
determining an on/off control flag for ones of the parallel processing regions in the filtered picture indicating whether pixel values of the filtered picture are adopted in the respective parallel processing region to form a denoised picture.

19. A method, comprising:
receiving a reconstructed picture;
partitioning the reconstructed picture into a plurality of patches;
partitioning the reconstructed picture into processing regions that each include a subset of the plurality of patches; and
processing the processing regions to form patch groups for the plurality of patches, including searching for one or more corresponding reference patches similar to a particular patch with a predictor-based search algorithm to form a particular patch group, a similarity measure between any one of the one or more corresponding reference patches and the particular patch in the particular patch group, calculated based on differences between corresponding pixel values, being above a threshold; and
for the particular patch group that includes the particular patch and the one or more corresponding reference patches,
  selecting a target non-local denoising technology from two or more candidate non-local denoising technologies, and
  denoising the particular patch according to the one or more corresponding reference patches with the target non-local denoising technology,
wherein patches within a particular processing region are processed in parallel to form respective patch groups using the predictor-based search algorithm without usage of patch predictors within the particular processing region, a patch predictor of a currently-being-processed patch being a reference patch in a patch group for a neighboring patch of the currently-being-processed patch.

20. The method of claim 19, further comprising:
sequentially processing the processing regions to form patch groups for the plurality of patches of the reconstructed picture.

\* \* \* \* \*